United States Patent [19]

Matsumoto

[11] Patent Number: 5,749,141
[45] Date of Patent: May 12, 1998

[54] AUTOMATIC TIRE VALVE INSERTION APPARATUS FOR TUBELESS TIRE

[75] Inventor: Shinji Matsumoto, Kiryu, Japan

[73] Assignee: Fuji Jukogyo Kabushiki Kaisha, Tokyo-To, Japan

[21] Appl. No.: 580,329

[22] Filed: Dec. 28, 1995

[30] Foreign Application Priority Data

Jan. 6, 1995 [JP] Japan ..................... 7-000880

[51] Int. Cl.$^6$ ..................... B23P 19/00
[52] U.S. Cl. ..................... 29/714; 29/717; 29/221.5
[58] Field of Search ............. 29/407.04, 407.05, 29/407.1, 709, 712, 714, 711, 720, 787, 789, 802, 221.5; 361/173, 177; 267/137, 150

[56] References Cited

U.S. PATENT DOCUMENTS

| | | | |
|---|---|---|---|
| 4,353,156 | 10/1982 | Rosaz | 29/221.5 |
| 4,408,668 | 10/1983 | Kuhn et al. | 267/137 X |
| 4,485,562 | 12/1984 | De Fazio | 267/150 |
| 5,384,956 | 1/1995 | Sakurai et al. | 29/709 |

FOREIGN PATENT DOCUMENTS

| | | | |
|---|---|---|---|
| 59-232737 | 12/1984 | Japan | 29/720 |
| 6-45786 | 2/1994 | Japan | 29/720 |
| 917373 | 3/1982 | U.S.S.R. | 29/714 |

OTHER PUBLICATIONS

Hiller, R., IBM Technical Disclosure Bulletin, vol. 1, No. 3, p. 9, Oct. 1958.

Primary Examiner—S. Thomas Hughes
Attorney, Agent, or Firm—Beveridge, DeGrandi, Weilacher & Young, LLP

[57] ABSTRACT

Provided is an automatic tire valve insertion apparatus for tubeless tire, in which a tire valve can be smoothly inserted into a valve hole of a wheel without entailing damage to the tire valve, wheel, push rod, etc. even though the position of the valve hole varies in the radial and width directions of the wheel. In the tire valve insertion apparatus, the valve hole of the wheel being rotated is detected, the wheel is stopped at a predetermined position by braking, and the tire valve is inserted into the valve hole by means of the push rod of a valve press-fitting device. A light emitting element for emitting a detection light to be transmitted through the valve hole and a light sensing element for receiving the detection light are arranged facing each other across the rotating wheel. The light emitting and sensing ranges of these elements are elongated in a direction perpendicular to a circular path of movement of the valve hole.

6 Claims, 13 Drawing Sheets

AUTOMATIC TIRE VALVE INSERTION APPARATUS FOR TUBELESS TIRE

BACKGROUND OF THE INVENTION

1. Field of the Invention

The present invention relates to an automatic tire valve insertion apparatus for tubeless tire, capable of automatically securely inserting a tire valve into a valve hole which is bored in a wheel.

2. Information of the Related Art

A tire valve of a snap-in type for tubeless tire is widely used in the field. FIG. 11 shows the tire valve 50 of the snap-in type that comprises a valve stem 50a, a rubber valve body 50b covering the stem 50a, and a ring-shaped flange portion 50c protruding from the proximal end of the body 50b.

There has been proposed an automatic tire valve insertion apparatus which can be used to attach the tire valve 50 of this type to a wheel. In this apparatus, the valve 50 is temporarily inserted into a valve hole which is bored in the wheel, and thereafter, the valve stem 50a is gripped and drawn in, and the valve 50 is attached to the wheel in a manner such that the valve hole is held by means of the flange 50c. In some cases, however, a valve cap 51 may be broken when the valve stem 50a is gripped, since the state of the temporarily inserted tire valve is unstable.

To cope with this, there has been proposed an automatic tire valve insertion apparatus for tubeless tire which is described in Japanese Patent Publication (KOKOKU) No. 2-46403 and is shown in the front view of FIG. 12, side view of FIG. 13, and plan view of FIG. 14. In this apparatus, when a wheel W transported by means of a belt conveyor 61 stops its movement abutting against a stopper 62, a cylinder 63 extends so that a conical engaging portion 64 is fitted into a hub hole (not shown) of the wheel disk, thereby centering and lifting the wheel W.

When the wheel W abuts against the lower end face of a friction disk 65, as indicated by dashed line in FIG. 12, its ascent is stopped, and this state is maintained by the cylinder 63. Then, a drum 66 rotates, so that the wheel W is rotated substantially in synchronism with the friction disk 65 by means of the frictional force of the disk 65.

As the wheel W rotates in this manner, a wheel size detecting switch 67 starts detection, and a valve hole detecting switch 68 is activated in accordance with the result of the detection. The valve hole detecting switch 68 is composed of a phototube 68a and a light sensing element 68b. The optical axis of a detection light emitted from the phototube 68a crosses a circular path of movement of a valve hole Wa of the wheel W. When the light sensing element 68b receives the detection light which is transmitted through the valve hole Wa while the wheel W is rotating, an output signal from the element 68b is delivered to a braking device 69, whereupon a clutch mechanism is disengaged, and a braking mechanism is actuated. As the force of inertia naturally attenuates, the wheel W in braked rotation stops from rotating. When the valve hole Wa of the stopped wheel W reaches the detecting position of a valve hole stop position confirmation switch 70, the detection light is transmitted through the valve hole Wa and sensed by the light sensing element 68b. The output signal from the element 68b is delivered to an up-and-down cylinder 72 of a valve press-fitting device 71, whereupon the cylinder 72 extends.

As the up-and-down cylinder 72 extends in this manner, a push rod 73 is raised along the axis of the valve hole Wa of the wheel W so that the tire valve 50 is inserted into the valve hole Wa with the valve cap 51 ahead.

When the upper motion limit position of the push rod 73 is detected by a reed switch which is attached to the up-and-down cylinder 72, the cylinder 72 contracts and lowers so that the distal end portion of the rod 73 is drawn out of the tire valve 50, and the rod 73 reaches its lower motion limit position. When the push rod 73 reaches its lowest position in this manner, the valve hole stop position confirmation switch 70 starts detection again, whereupon it determines whether or not the tire valve 50 is press-fitted in the valve hole Wa. While the tire valve 50 is being press-fitted, the wheel W stops its rotation and maintains the same position for the detection with respect to the wheel W. If the detection light is not received by the light sensing element 68b, therefore, the switch 70 concludes that the tire valve 50 is press-fitted, and delivers an output signal to the cylinder 72.

In response to this signal from the valve hole stop position confirmation switch 70, the cylinder 72 contracts so that the wheel W, fitted with the tire valve 50, lowers supported by the engaging portion 64. Thus, the wheel W is placed on the belt conveyor 61, whereupon the stopper 62 is actuated to allow the wheel W to be delivered or unloaded.

Thus provided with the wheel size detecting switch, valve hole detecting switch, valve hole stop position confirmation switch, etc., the automatic tire valve insertion apparatus for tubeless tire disclosed in Jpn. Pat. Appln. KOKOKU Publication No. 2-46403 can perform a series of operations from the valve hole detection to the tire valve insertion automatically and continuously. In wheels with different widths or temporary-use tire wheels, however, the valve hole position is deviated in the radial direction from the reference position Wa, as indicated by broken line Wa' in the plan view of FIG. 16, despite the sameness in the wheel size. Accordingly, the position of the valve hole to be detected relative to the optical axis a of the phototube of the valve hole detecting switch varies depending on the wheel width and the like. In the arrangement shown in FIG. 16, for example, the valve hole represented by broken line Wa' may be detected as if it were situated in the position represented by imaginary line Wa", so that a deviation is produced between the respective axes of the actual valve hole and the push rod to be extended to press-fit the tire valve. In press-fitting the tire valve, therefore, the valve may possibly be crushed between the distal end of the push rod and the peripheral edge of the valve hole. As the push rod comes into contact with the periphery of the valve hole, moreover, the wheel and the push rod may be damaged in some cases. The same trouble may also occur if the tire valve is inserted with the respective axes of the wheel and the engaging portion deviated from each other.

SUMMARY OF THE INVENTION

The object of the present invention is to provide an automatic tire valve insertion apparatus for tubeless tire, in which a tire valve can be smoothly inserted into a valve hole of a wheel without entailing damage to the tire valve, wheel, push rod, etc. even though the position of the valve hole varies in the radial directions of the wheel.

In order to achieve the above object, according to the present invention, there is provided an automatic tire valve insertion apparatus for tubeless tire, which comprises a valve hole detecting switch for detecting a valve hole of a wheel being rotated and stopping the wheel at a predetermined position by braking, and a valve press-fitting device for inserting a push rod, having a tire valve held on the distal end thereof, into the valve hole of the wheel at the predetermined position and press-fitting the tire valve into the valve hole.

In this apparatus, the valve hole detecting switch includes a light emitting unit and a light sensing unit arranged facing each other across the rotating wheel, the optical axis of a light emitted from the light emitting unit intersects a circular path of movement of the valve hole of the rotating wheel, and the light sensing unit receives the light with a width range elongated in a direction perpendicular to the circular path of movement.

BRIEF DESCRIPTION IF THE DRAWINGS

DETAILED DESCRIPTION OF THE PREFERRED EMBODIMENTS

An automatic tire valve insertion apparatus for tubeless tire according to one embodiment of the present invention will now be described in detail with reference to the accompanying drawings.

Figure 1:
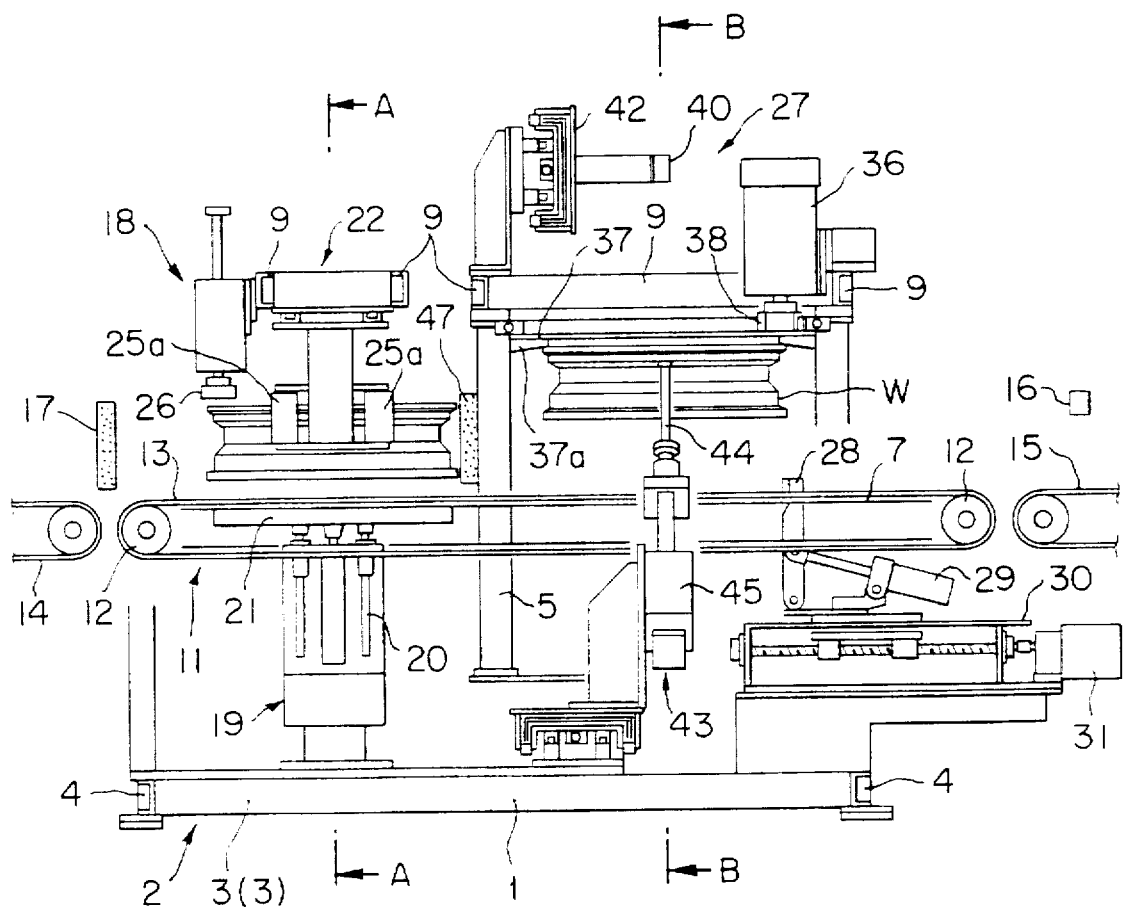
FIG. 1 is a view, partially in section, showing an outline of an automatic tire valve insertion apparatus for tubeless tire according to one embodiment of the present invention.
Figure 2:
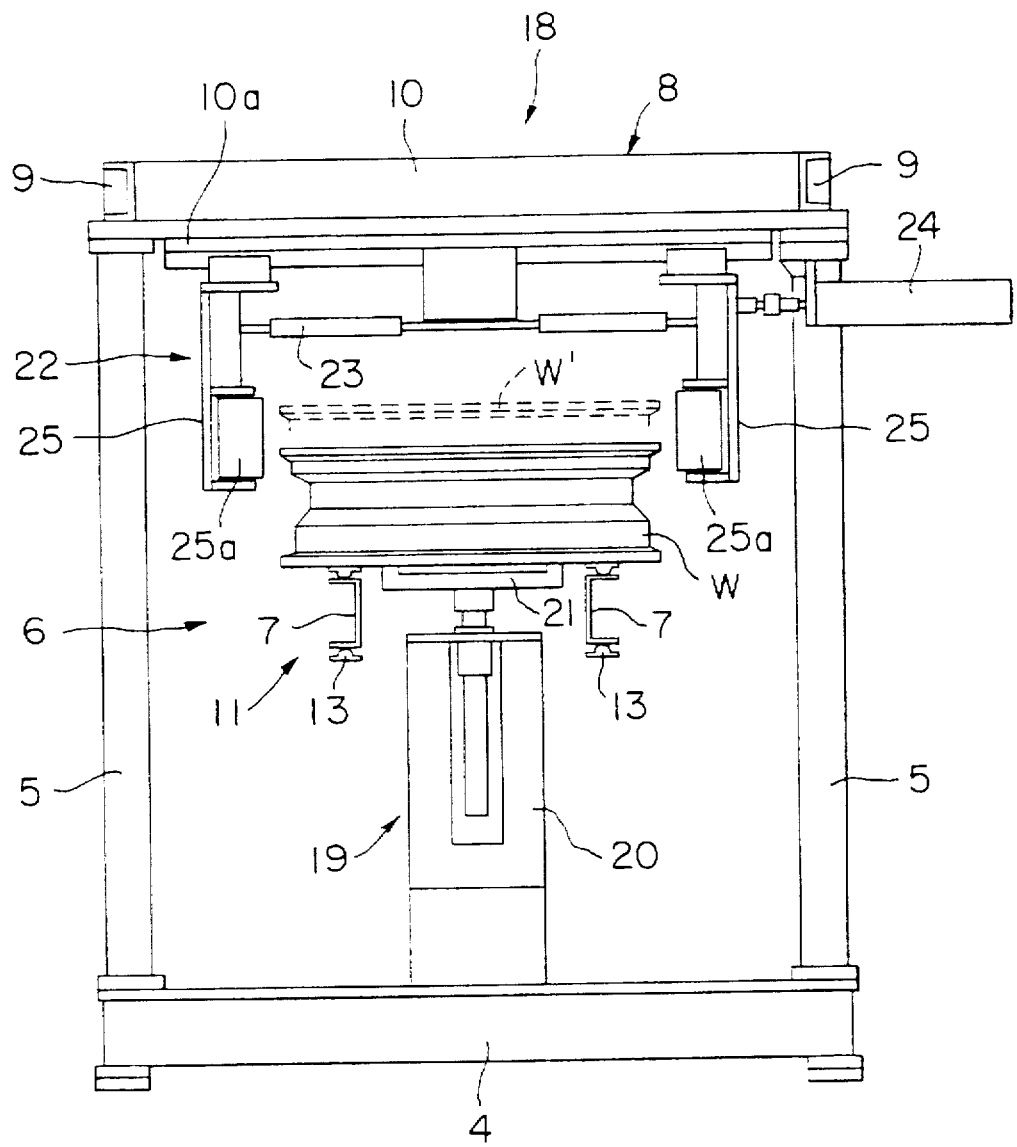
FIG. 2 is a sectional view taken along line A-A of FIG. 1.
Figure 3:
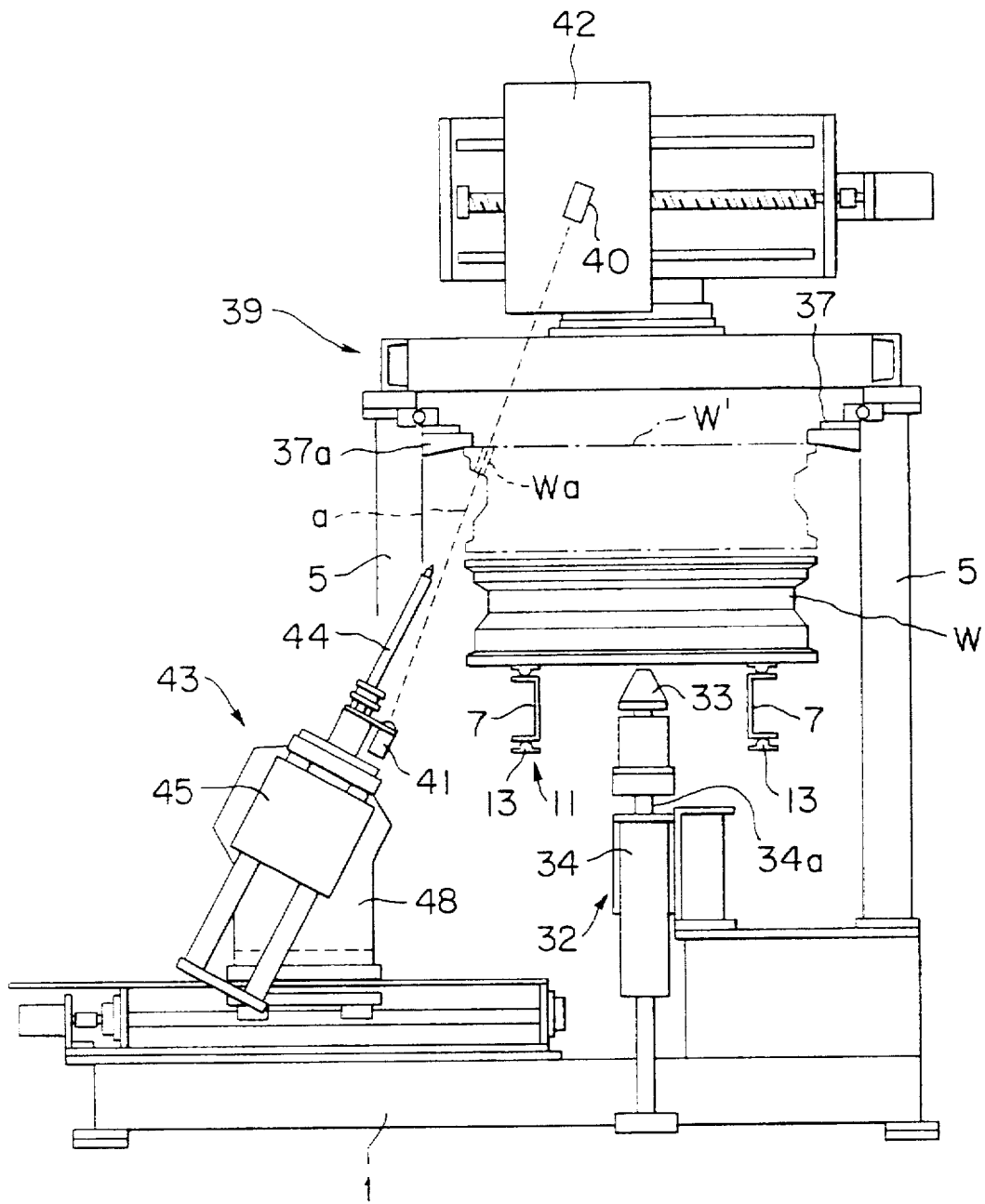
FIG. 3 is a sectional view taken along line B-B of FIG. 1.

FIG. 1 is a view, partially in section, showing an outline of the apparatus according to the present embodiment, and FIGS. 2 and 3 are sectional views taken along lines A—A and B—B of FIG. 1, respectively.

In these drawings, numeral 1 denotes a machine base, which comprises a lower frame 2 formed of a pair of lower longitudinal frames 3 and a pair of lower cross frames 4 fixed on the floor surface, an intermediate frame 6 formed of a plurality of vertical frames 5 set up on the lower frame 2 and a pair of intermediate longitudinal frames 7 fixed to the intermediate portions of the vertical frames 5 and facing each other, and an upper frame 8 formed of a pair of upper longitudinal frames 9 and a pair of upper cross frames 10 fixed to the upper portions of the vertical frames 5. The intermediate frame 6 is provided with a belt conveyor 11 for use as transportation means for transporting a wheel W into which a tire valve 50 is to be inserted.

The belt conveyor 11 includes a pair of rollers 12 rotatably mounted on the opposite end portions of the intermediate longitudinal frames 7 and a pair of belts 13 passed around and between the rollers 12. A supply conveyor 14 and a take out conveyor 15 are arranged outside the rollers 12 in a manner such that the wheel W can be delivered to and from the belt conveyor 11. A wheel delivery confirmation switch 16 is attached to the starting end portion of the take out conveyor 15. The switch 16 detects the wheel W delivered to the take out conveyor 15, and sends its signal to a drive unit for a stopper 17 which is provided at the terminal portion of the supply conveyor 14. Normally, the stopper 17 is situated over the supply conveyor 14, thereby preventing the wheel W from being delivered to the belt conveyor 11. In response to the detection signal from the wheel delivery confirmation switch 16, the stopper 17 is actuated and retracts from the region over the supply conveyor 14, thereby allowing one wheel W, which is transport by the conveyor 14, to be delivered onto the belt conveyor 11.

A retractable stopper 47 is located over the transporting surface of the belt conveyor 11. Normally, the stopper 47 is situated below the transporting surface of the conveyor 11, thereby allowing the wheel W to be transported. In response to the detection signal from the wheel delivery confirmation switch 16, the stopper 47 is actuated and projects above the transporting surface of the conveyor 11, thereby preventing the transportation of the wheel W. The stopper 47 maintains the projected state for a given period of time. When the wheel W is raised by a lifter unit 19 for wheel size detection, thereafter, the stopper 47 returns to the position under the transporting surface.

Numeral 18 denotes a wheel size detecting device, which comprises the lifter unit 19, centering mechanism 22, and detecting unit 26. The lifter unit 19 includes a supporting portion 21 which projects and retracts through the space between the belts 13 of the belt conveyor 11 as cylinders 20 extend and contract, thereby raising the wheel W, which is prevented by the stopper 47 from being transported, and placing the raised wheel W on the belt conveyor 11. The centering mechanism 22 includes a pair of abutting portions 25 and a pair of abutting rollers 25a attached to each abutting portion 25. As a cylinders 24 is actuated, the abutting portions 25 are caused, by means of a link mechanism 23, to move toward and away from each other along rails 10a which are attached individually to the upper cross frames 10. The rollers 25a hold the wheel W on the supporting portion 21, which is raised by the lifter unit 19, thereby centering the wheel W. Also, the centering mechanism 22 measures the diameter of the wheel W on the basis of the movement of the abutting portions 25. The detecting unit 26 is adapted to lower and engage the wheel W centered by the centering mechanism 22, thereby detecting the width of the wheel W and the wheel type, whether aluminum wheel, steel wheel, or temporary-use tire wheel. Various detection signals from the wheel size detecting device 18 are delivered to a valve insertion apparatus 27 (described below).

The following is a description of the valve insertion apparatus 27 which inserts the tire valve 50 into the wheel W whose size and the like have been detected by means of the wheel size detecting device 18.

The valve insertion apparatus 27 comprises a stopper 28 which can project above and retract below the transporting surface of the belt conveyor 11. The stopper 28 is rocked by means of a cylinder 29. Normally, the stopper 28 projects above the transporting surface of the belt conveyor 11, thereby preventing the transportation of the wheel W. When the wheel W is delivered in a manner such that it is lowered by means of a wheel lifter 32 for valve insertion, the stopper 28 moves to a position below the belt conveyor 11 in response to a signal from the lifter 32, thereby allowing the wheel W to be carried out by means of the belt conveyor 11. The stopper 28 and the cylinder 29 are mounted on a slider 30 which is supported on the machine base 1. Movement control based on the wheel size and the like can be effected in a manner such that the slider 30 is moved by controlling a motor 31 in response to the wheel size detection signals from the wheel size detecting device 18.

The wheel lifter 32 for valve insertion is used to raise the wheel W which is prevented by the stopper 28 from being transported. The lifter 32 includes an engaging portion 33 called a center cone, which can stroke a predetermined height above the transporting surface of the belt conveyor 11. The engaging portion 33 is substantially in the shape of a circular cone which can be fitted in a hub hole (not shown) of the wheel W. The wheel W can be raised and lowered in a manner such that the hub hole is fitted on the conical surface of the engaging portion 33. Thus, wheels W having various hub apertures can be supported on the conical surface of the engaging portion 33 which tapers upward. Also, the position of the hub hole of the wheel W which is stopped by the stopper 28 may be allowed to be slightly deviated from the axis of the engaging portion 33.

The engaging portion 33 is connected to a piston rod 34a of an air cylinder 34 on the machine base 1 for rotation and up-and-down motion. Normally, the tip end of the engaging portion 33 is situated below the transporting surface of the belt conveyor 11 so as to permit the transportation of the wheel W. When the wheel W on the belt conveyor 11 stops its movement abutting against the stopper 28, the engaging portion 33 is raised by the extension of the air cylinder 34. After the tire valve 50 is press-fitted into a valve hole Wa of the wheel W when the engaging portion 33 is in its upper motion limit position, the engaging portion 33 is lowered.

The upper frame 8 over the belt conveyor 11 is provided with a wheel drive device 36 which includes a wheel driving pulley 37 and a rotating unit 38. The driving pulley 37 is in the form of a drum which has a gear on its outer peripheral surface and is rotatably supported on the upper frame 8. A friction disk 37a formed of a rubber ring is attached to the lower surface of the pulley 37.

The wheel driving pulley 37 is rotated by means of a gear in the wheel drive device 36. The drive device 36 includes a motor, which drives the pulley 37 with the aid of a speed reducer and a braking device. The braking device is provided with a clutch mechanism. Normally, a braking mechanism and the clutch mechanism of the braking device are off, so that no torque is transmitted to the wheel driving pulley 37. When the wheel W ascends together with the engaging portion 33 and abuts against the friction disk 37a, the clutch mechanism and a timer are worked, whereupon a torque is transmitted to the driving pulley 37, thereby rotating it. If the position of the valve hole Wa of the wheel W, which rotates in synchronism with the pulley 37, is detected by means of a valve hole detecting switch 39 (mentioned later) within a predetermined time which is set in the timer, the clutch mechanism is disengaged, and at the same time, the braking mechanism is actuated to brake the rotation of the pulley 37.

The braking mechanism is released when the pulley 37 is stopped. If the position of the valve hole Wa of the wheel W is not detected by the detecting switch 39 within the preset time of the timer, on the other hand, an NG state is established such that the clutch is disengaged and the rotation of the wheel driving pulley 37 is stopped.

When the clutch mechanism is thrown in, the wheel driving pulley 37 and the wheel W, braked and stopped from rotating, are rotated reversely at a relatively low speed by the wheel drive device 36. When the valve hole Wa of the wheel W is detected by the valve hole detecting switch 39, the clutch mechanism is worked to stop the reverse rotation of the driving pulley 37 or the wheel W in a moment. Then, a signal is delivered to a valve press-fitting device 43 (mentioned later), whereupon a push rod 44 starts to insert the tire valve 50. If the valve hole Wa cannot be recognized by the valve hole detecting switch 39 in the predetermined time, the NG state is established.

The valve hole detecting switch 39 includes a light emitting element (light emitting unit) 40 and a light sensing element (light sensing unit) 41 which are located above and below the wheel driving pulley 37. The light emitting element 40 is attached to a supporting member 42 which is movably mounted on the upper frame 8, and is designed so that its movement can be regulated in accordance with the degree of projection of the valve hole Wa which varies depending on the wheel size, wheel type, etc. detected by the wheel size detecting device 18.

On the other hand, the light sensing element 41 is attached to the valve press-fitting device 43. As shown in the plan view of FIG. 4 which illustrates the relative positions of the switch elements 40 and 41, the light sensing element 41 is formed of a wide-range sensor which is elongated in the radial direction of the wheel driving pulley 37, that is, a direction perpendicular to a circular path of movement of the valve hole Wa of the wheel W which rotates in synchronism with the pulley 37. An optical axis $a$ of a detection light emitted from the wide-range light emitting element 40, which is elongated in a direction perpendicular to the aforesaid circular movement path of the valve hole Wa, can be caused to intersect the movement path by moving a support 48 for supporting a push rod actuating unit 45 in the radial direction of the pulley 37. When the valve hole Wa passes the point of intersection, the light sensing element 41 is made to sense the detection light transmitted through the hole Wa, and its output signal is delivered to the wheel drive device 36. In response to this signal, the clutch mechanism is disengaged, and the braking mechanism is actuated to stop the rotation of the wheel driving pulley 37. Thereafter, the braking mechanism is released.

The following is a description of the valve press-fitting device 43. As shown in FIG. 3, the device 43 comprises the push rod actuating unit 45 which includes the push rod 44 and an air cylinder for vertically moving the rod 44. The push rod actuating unit 45 is mounted on the support 48 which is supported on the machine base 1 so as to be movable toward and away from the axis of rotation of the wheel driving pulley 37. The movement of the support 48 is regulated depending on the wheel size, wheel type, etc. detected by the wheel size detecting device 18.

Figure 5:
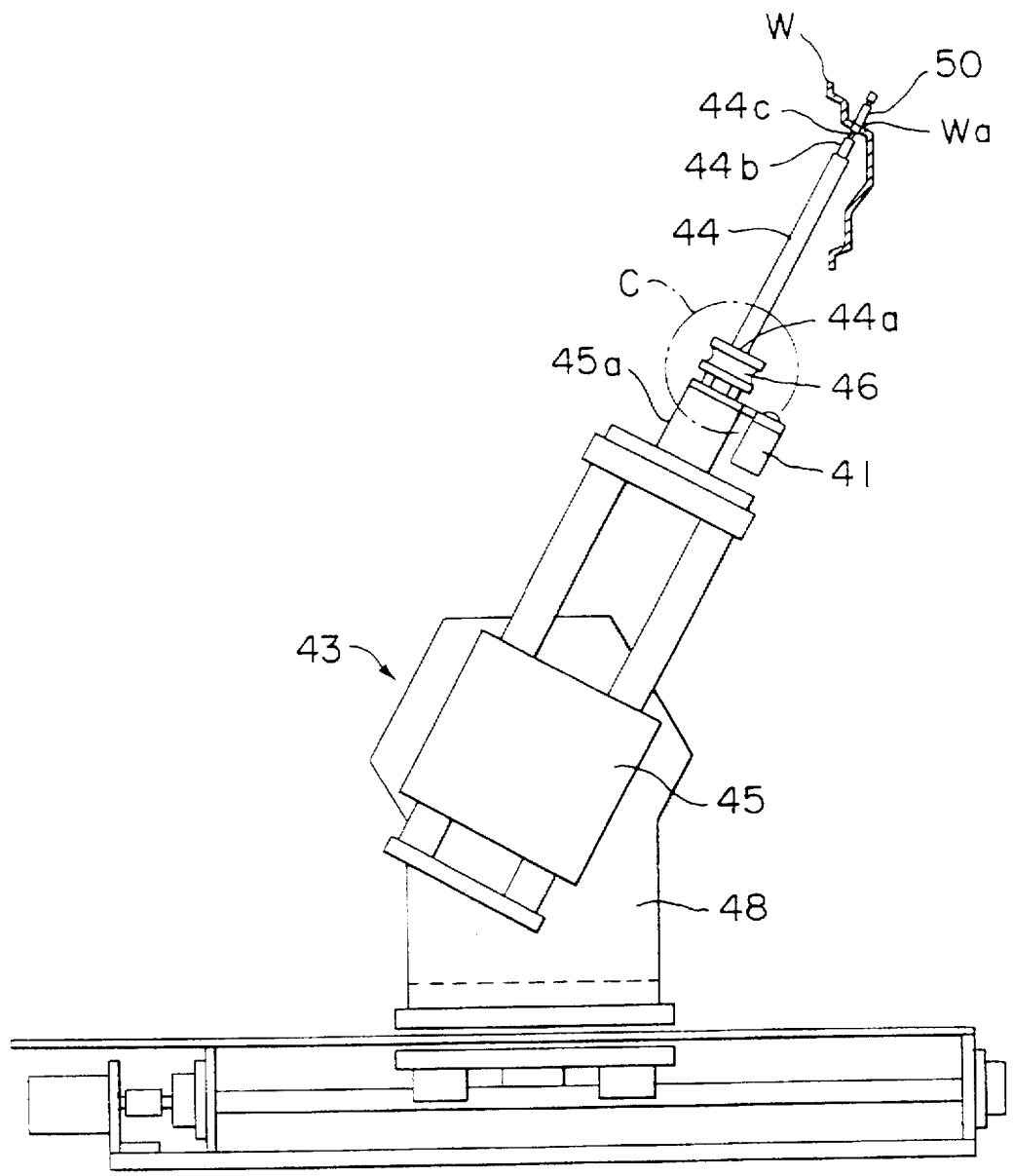
FIG. 5 is a view, partially in section, for illustrating a push rod and a flexible member used in the apparatus shown in FIG. 1.

As shown in FIG. 5, the push rod 44, which is moved up and down by the push rod actuating unit 45, is an elongate column whose proximal end 44a is connected to a piston rod 45a of the aforesaid air cylinder by means of a flexible member 46. A thin butting portion 44b is provided on the distal end of the push rod 44 so that the rod 44 has a shoulder. A thinner pointed plug-in portion 44c is attached to the distal end of the butting portion 44b.

Figure 6:
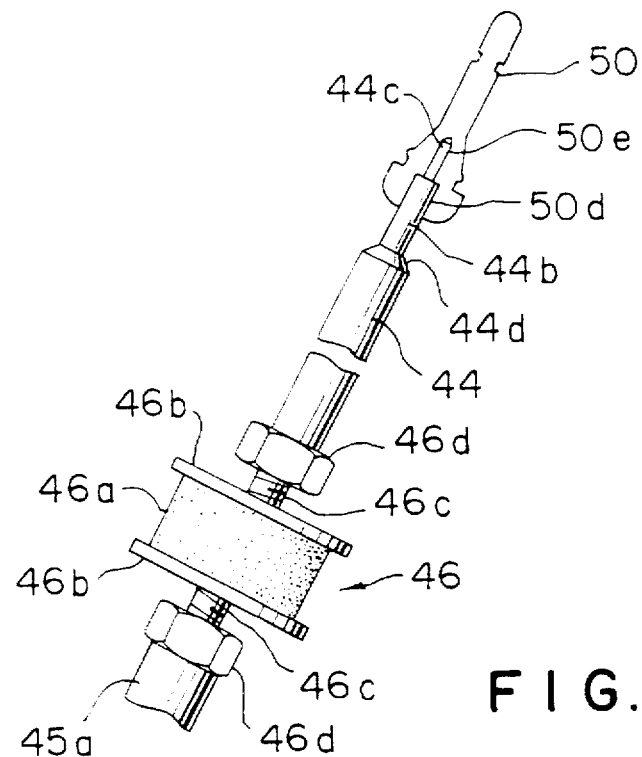
FIG. 6 is an enlarged sectional view showing a portion C of FIG. 5.

As shown in the enlarged sectional view of FIG. 6, the butting portion 44b of the push rod 44 is inserted in a recess 50d in the tire valve 50, and the plug-in portion 44c is inserted in a small hole 50e which communicates with the recess 50d, thereby supporting the valve 50. In press-fitting the tire valve 50, on the other hand, the push rod 44 is raised to force the valve 50 into the valve hole Wa in a manner such that the distal end of the butting portion 44b engages the bottom of the recess 50d, as shown in FIG. 5.

The flexible member 46, which is interposed between the piston rod 45a of the air cylinder of the push rod actuating unit 45 and the proximal end 44a of the push rod 44, as shown in FIG. 6, is composed of an elastic member 46a of rubber or the like, two mounting plates 46b oppositely bonded to the elastic member 46a, and screw portions 46c protruding individually from the mounting plates 46b. The screw portions 46c are screwed into their corresponding nut portions 46d which are attached individually to the piston rod 45a and the proximal end 44a of the push rod 44. By doing this, the push rod 44 is connected to the distal end of piston rod 45a of the push rod actuating unit 45 in a manner such that it is coaxial with the rod 45a and can incline when a load in a direction deviated from the axial direction acts on its distal end.

Figure 7:
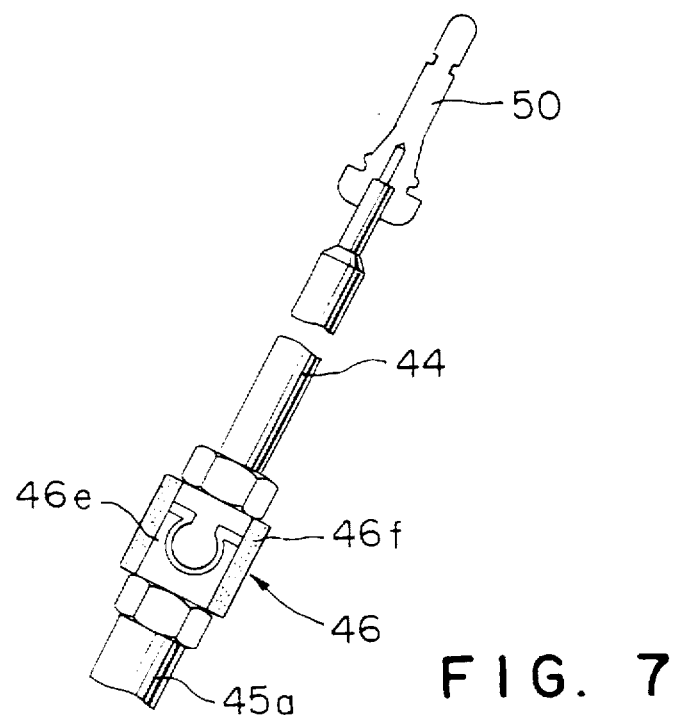
FIG. 7 is a view, partially in section, for illustrating a modification of the flexible member.

FIG. 7 shows a modification of the flexible member 46. This flexible member 46 is composed of a joint 46e and a urethane rubber cylinder 46f or an elastic member such as a coil spring. The joint 46e rockably connects the distal end of the piston rod 45a and the proximal end 44a of the push rod 44. The rubber cylinder 46f contains the joint 46e therein and serves to maintain the piston rod 45a and the push rod 44 coaxial with each other in a manner such that the distal end of the rod 45a and the proximal end 44a of the rod 44 are connected flexibly.

The apparatus according to the present embodiment comprises a tire valve delivery device (not shown) for supplying the tire valve 50 to the push rod 44, besides the devices described above.

Figure 8:
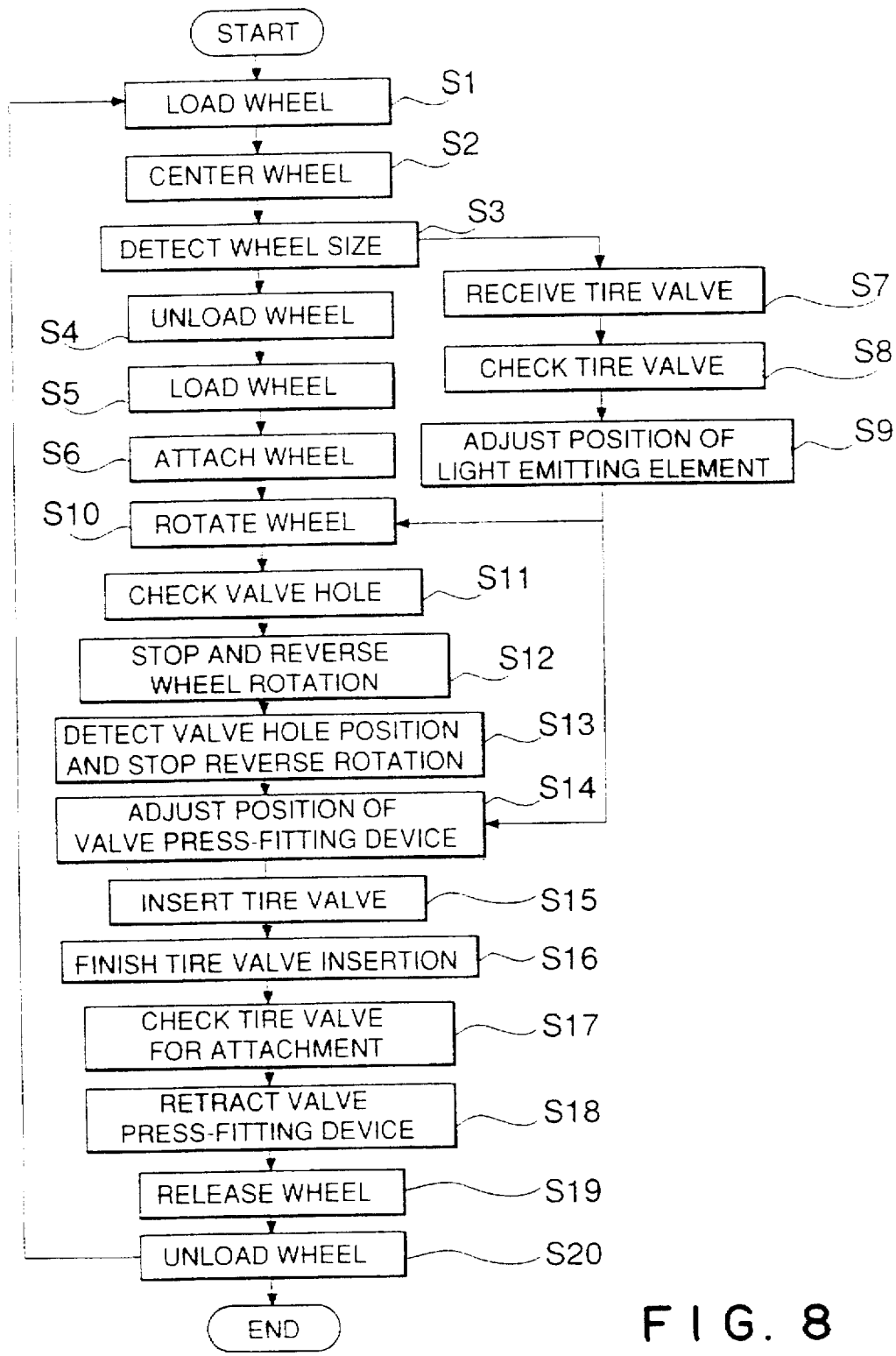
FIG. 8 is a flowchart for illustrating the operation of the automatic tire valve insertion apparatus shown in FIG. 1.

Referring now to the flowchart of FIG. 8, the operation of the automatic tire valve insertion apparatus for tubeless tire, constructed in the aforementioned manner, will be described.

The operation of the insertion apparatus consists of a wheel size detection process I of Steps S1 to S4 executed mainly by the wheel size detecting device 18 and a tire valve insertion process II of Steps S5 to S20 executed mainly by the valve insertion apparatus 27.

When the automatic tire valve insertion apparatus is in operation, the belt conveyor 11, supply conveyor 14, and take out conveyor 15 are activated so that the wheel W can be fed onto the belt conveyor 11. Normally, the stopper 17 projects at the terminal end of the supply conveyor 14, thereby engaging the wheel W transported by the conveyor 14 and preventing it from being carried onto the belt conveyor 11. Also, the stopper 47 projects above the transporting surface of the belt conveyor 11, thereby blocking the path of transfer of the wheel W, while the air cylinder 34 contracts so that the engaging portion 33 is situated below the transporting surface of the belt conveyor 11, thereby opening the path of transfer of the wheel W.

In this state, the stopper 17 retracts from the transporting surface of the supply conveyor 14 in Step S1, thereby opening the path of transfer and allowing one wheel W to be fed onto the belt conveyor 11. Thereupon, the wheel W is transported by means of the belt conveyor 11, and stops its movement abutting against the stopper 47.

When the stopper 47 stops the wheel W, a signal is delivered to a drive unit for the lifter unit 19 of the wheel size detecting device 18 in Step S2, and the cylinders 20 of the unit 19 extend so that the wheel W is raised for a predetermined distance above the transporting surface of the belt conveyor 11 by means of the supporting portion 21, and stopped at a position indicated by broken line W' in FIG. 2. Subsequently, the cylinder 24 of the centering mechanism 22 is actuated to center the wheel W on the supporting portion 21 in a manner such that the wheel W is held between the abutting rollers 25a of the pair of abutting portions 25.

Then, in Step S3, the diameter of the wheel W, that is, wheel size, is detected in accordance with the movement of the abutting portions 25 for the wheel centering in Step S2, and the detecting unit 26 is lowered to abut against the wheel W. The width and type of the wheel W are detected from this descent of the detecting unit 26 on the basis of previously stored wheel information. The obtained signals are delivered to the valve insertion apparatus 27 which are activated in Steps S5 to S20, and the stopper 47 is retracted from the position over the transporting surface of the belt conveyor 11, thereby opening the path of transfer. Also, the position of the stopper 28 is adjusted by moving the slider 30 in accordance with the detected size of the wheel W.

The wheel W, whose size and other specifications have been detected in Step S3, is delivered from the wheel size detecting device 18 in Step S4. In doing this, the cylinder 24 of the centering mechanism 22 is actuated to separate the two abutting portions 25 by means of the link mechanism 23, thereby releasing the wheel W from the hold by the abutting rollers 25a. Further, the cylinder 20 of the lifter unit 19 is contracted to lower the wheel W together with the supporting portion 21. Thus, the wheel W is placed on the transporting surface of the belt conveyor 11, whereupon it is delivered from the wheel size detecting device 18 by the conveyor 11.

The wheel W, having been delivered from the wheel size detecting device 18 in Step S4, is transported by the belt conveyor 11 and stops its movement abutting against the stopper 28 which has previously been moved in accordance with the size of the wheel W. Thereupon, the wheel W is delivered to the valve insertion apparatus 27 in Step S5.

When the stopper 28 stops the wheel W, a signal is delivered to a drive unit for the lifter 32 for valve insertion, whereupon the air cylinder 34 extends so that the engaging portion 33 of the piston rod 34a is fitted into the hub hole (not shown) of the wheel W. Thus, the wheel W is centered as it is lifted. Since the engaging portion 33 is conical in shape, it is fitted tight in the hub hole, thereby ensuring the stability of the supported wheel W and permitting a slight deviation, if any, of the position of the stopped wheel W from the axis of the engaging portion 33. When the air cylinder 34 further extends to cause the wheel W to abut against the friction disk 37a, as indicated by broken line W' in FIG. 3, the ascent of the wheel W is stopped, and this state is maintained by the air cylinder 34.

In Step S7, after Step S3 in which the size and other specifications of the wheel W are detected and before Step S6 in which the wheel W is loaded into the valve insertion apparatus 27, the tire valve 50 of the type which matches the wheel W to be loaded is selected in accordance with the signals indicative of the wheel type and other items detected in Step S3, and is attached to the distal end of the push rod 44 by means of the tire valve delivery device, as shown in FIG. 6. In Step S8, it is determined whether or not the tire valve 50 is appropriately attached to the distal end of the push rod 44. If the attachment is inappropriate, an NG sign is displayed, and the tire valve 50 is attached again.

If it is concluded that the tire valve 50 is properly attached, the supporting member 42, which supports the light emitting element 40, and the support 48, which supports the push rod actuating unit 45 fitted with the light sensing element 41, are moved in Step S9 in accordance with the form of the valve hole Wa whose position and diameter varies depending on the wheel size, wheel type, etc. detected in Step S3. By doing this, the optical axis a of the detection light emitted from the light emitting element 40 is adjusted so as to intersect the circular movement path of the valve hole Wa of the wheel W.

When the wheel W is raised and stops its movement abutting against the friction disk 37a in Step S6, the clutch mechanism and timer of the braking device of the wheel drive device 36 are worked in Step S10, whereupon the wheel driving pulley 37 is rotated by the motor of the device 36, so that the wheel W is rotated substantially in synchronism with the friction disk 37a by means of the frictional force of the disk 37a. Also, the valve hole detecting switch 39 gets ready for operation.

Figure 4:
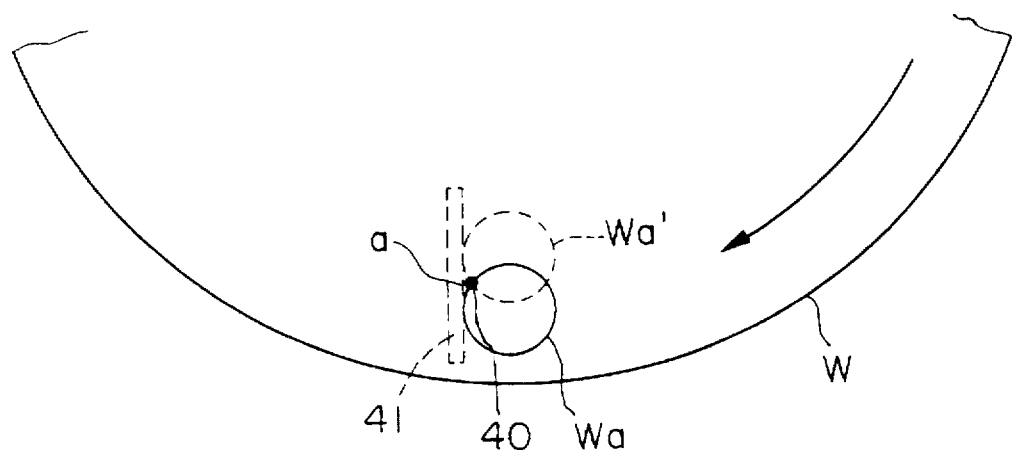
FIG. 4 is a diagram for illustrating a valve hole detecting switch used in the apparatus shown in FIG. 1.

As mentioned before, the optical axis a of the detection light emitted from the light emitting element 40 of the valve hole detecting switch 39 crosses the circular movement path of the valve hole Wa of the wheel W. When the light sensing element 41 receives the detection light which is transmitted through the valve hole Wa while the wheel W is rotating, therefore, an output signal from the element 41 is delivered to the wheel drive device 36 in Step S11. Since the light sensing element is elongated in the radial direction of the wheel W and has a wide range of reception, as shown in FIG. 4, the valve hole Wa can be appropriately detected even though it shifts its position in the radial direction of the wheel W, as indicated by broken line Wa'.

If the valve hole Wa is not detected by the valve hole detecting switch 39 within the detection time preset in the timer, on the other hand, the NG state is established, whereupon the subsequent processes of operation are interrupted, and an indication to that effect is given. Thus, defects in the valve hole Wa, clogging of the hole by mingled with foreign matter, etc., which constitute hindrances to the tire valve insertion, can be detected in advance, and confusion in the subsequent processes, failure in press fit, and damage to the valve insertion apparatus and the wheel can be prevented.

On receiving the signal from the valve hole detecting switch 39 in Step S11, the wheel drive device 36 disengages the clutch mechanism in Step S12. At the same time, the braking mechanism is actuated so that the torque transmission from the motor to the wheel driving pulley 37 is interrupted to brake the pulley 37. When braked in this manner, the wheel W stops from rotating as the force of inertia attenuates. After the rotation of the wheel W is stopped, the braking mechanism of the wheel drive device 36 is released, while the clutch mechanism is thrown in. Thereupon, the wheel driving pulley 37 is rotated reversely at a relatively low speed, and the timer is activated.

When the light sensing element 41 receives, in Step S13, the detection light which is emitted from the light emitting element 40 of the valve hole detecting switch 39 and transmitted through the valve hole Wa, the output signal is delivered to the wheel drive device 36. Thereupon, the clutch mechanism is disengaged, and the braking mechanism is actuated, whereby the rotation of the wheel driving pulley 37 or the wheel W is stopped in a moment.

If the valve hole Wa is not detected by the valve hole detecting switch 39 within the detection time preset in the timer, due to any failure in the switch 39, wheel drive device 36, etc., the NG state is concluded to be established, whereupon the subsequent processes of operation are interrupted, and an indication to that effect is given.

When the rotation of the wheel driving pulley 37 or the wheel W is stopped in Step S13, a corresponding signal is delivered to a drive unit for the support 48. In Step S14, the support 48 is moved toward or away from the axis of rotation of the wheel driving pulley 37 in accordance with the size, width, and type of the wheel W previously detected in Step S3, whereby the position of the valve press-fitting device 43 is adjusted.

Figure 9:
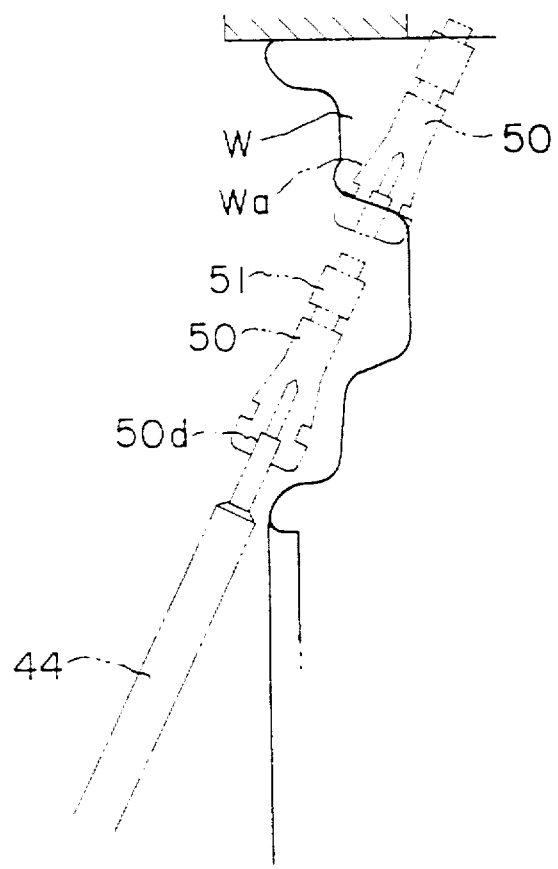
FIG. 9 is a view for illustrating the way a tire valve is inserted.

When the adjustment of the position of the valve press-fitting device 43 is completed, the device 43, on receiving a signal, operates in Step S15 so that the air cylinder of its push rod actuating unit 45 extends to raise the push rod 44 along the axis of the valve hole Wa of the wheel W. Thereupon, the tire valve 50 starts to be inserted into the valve hole Wa of the wheel W with a valve cap 51 ahead, as indicated by two-dot chain line in FIG. 9.

The tire valve 50 in the valve hole Wa penetrates deeper into the valve hole Wa as the push rod 44 rises, whereby the valve 50 is attached to the wheel W. When a reed switch attached to the air cylinder of the push rod actuating unit 45 detects the upper motion limit position of the push rod 44, the air cylinder starts to contract and descend. Thus, the distal end portion of the push rod 44 is drawn out of the tire valve 50, and the rod 44 descends as it is along the axis of the valve hole Wa and reaches its lower motion limit position, whereupon the tire valve insertion in Step S16 is completed. As the air cylinder of the push rod actuating unit 45 extends, the push rod 44 causes the tire valve 50 to be inserted into the valve hole Wa. Since a slight deviation, if any, between the respective axes of the push rod 44 and the valve hole Wa can be absorbed by the flexible member 46 which is mounted on the proximal end of the rod 44, the tire valve 50 is inserted along the axis of the hole Wa with the valve cap 51 ahead. Thus, the tire valve 50 can be prevented from being damaged by being partially squeezed between the inner peripheral surface of the valve hole Wa and the push rod 44.

Before or after the tire valve 50 reaches its lower motion limit position after being press-fitted, the valve hole detecting switch 39 detects the valve hole Wa again in Step S17, thereby determining whether or not the tire valve 50 is press-fitted in the hole Wa. While the tire valve 50 is being press-fitted, the wheel driving pulley 37 is stopped from rotating, and the wheel W maintains the same position for the detection, so that the optical axis a of the detection light from the light emitting element 40 crosses the position of the valve hole Wa. When the detection light is not received by the light sensing element 41, it is concluded that the tire valve 50 is press-fitted. When the detection light is received, on the other hand, it is concluded that the tire valve 50 is not press-fitted, and the NG state is established. Thus, those wheels W which have failed to be loaded with the tire valve can be extracted before they advance to the subsequent processes.

After the push rod 44 of the valve press-fitting device 43 reaches its lower motion limit position as the air cylinder of the push rod actuating unit 45 contracts in Step S16, the support 48 is restored to its original position in Step S18.

In Step S19, thereafter, the air cylinder 34 of the wheel lifter 32 for valve insertion contracts in response to the signal from the valve hole detecting switch 39, and the wheel W fitted with the tire valve 50 is supported by the engaging portion 33 as it descends, and is placed on the belt conveyor 11. The contracted air cylinder 34 moves to the position below the transporting surface of the belt conveyor 11, thereby permitting the delivery of the wheel W. When the wheel W abuts against the friction disk 37a, the stopper 28 is actuated in advance to retract to the position below the transporting surface of the belt conveyor 11.

Accordingly, the wheel W is transported by the belt conveyor 11 also in Step S20. When the wheel W passes the position for the detection by the wheel delivery confirmation switch 16 during the transportation by means of the belt conveyor 11, the delivery of the wheel W is confirmed, and a detection signal is delivered to the drive unit for the stopper 17. Thereupon, the stopper 17 retracts from the supply conveyor 14, thereby allowing another wheel W, having so far been stopped, to be fed onto the belt conveyor 11. Thus, insertion of the tire valve 50 into the next wheel W is started.

Figure 10:
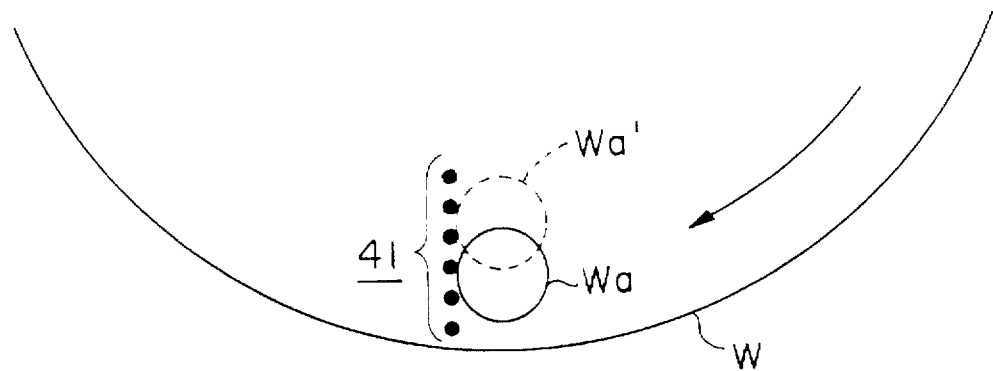
FIG. 10 is a diagram for illustrating a modification of the valve hole detecting switch used in the apparatus shown in FIG. 1.
Figure 11:
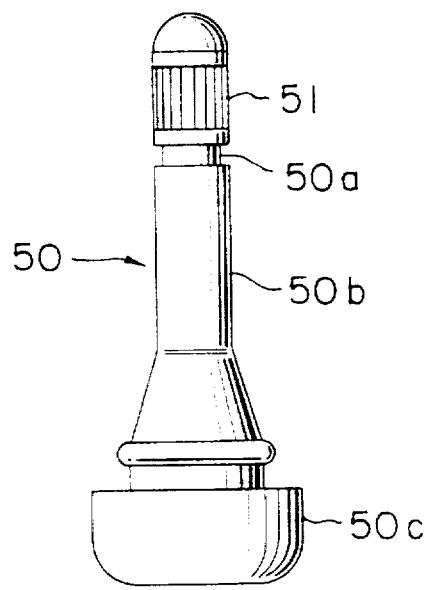
FIG. 11 is a view showing the tire valve.
Figure 12:
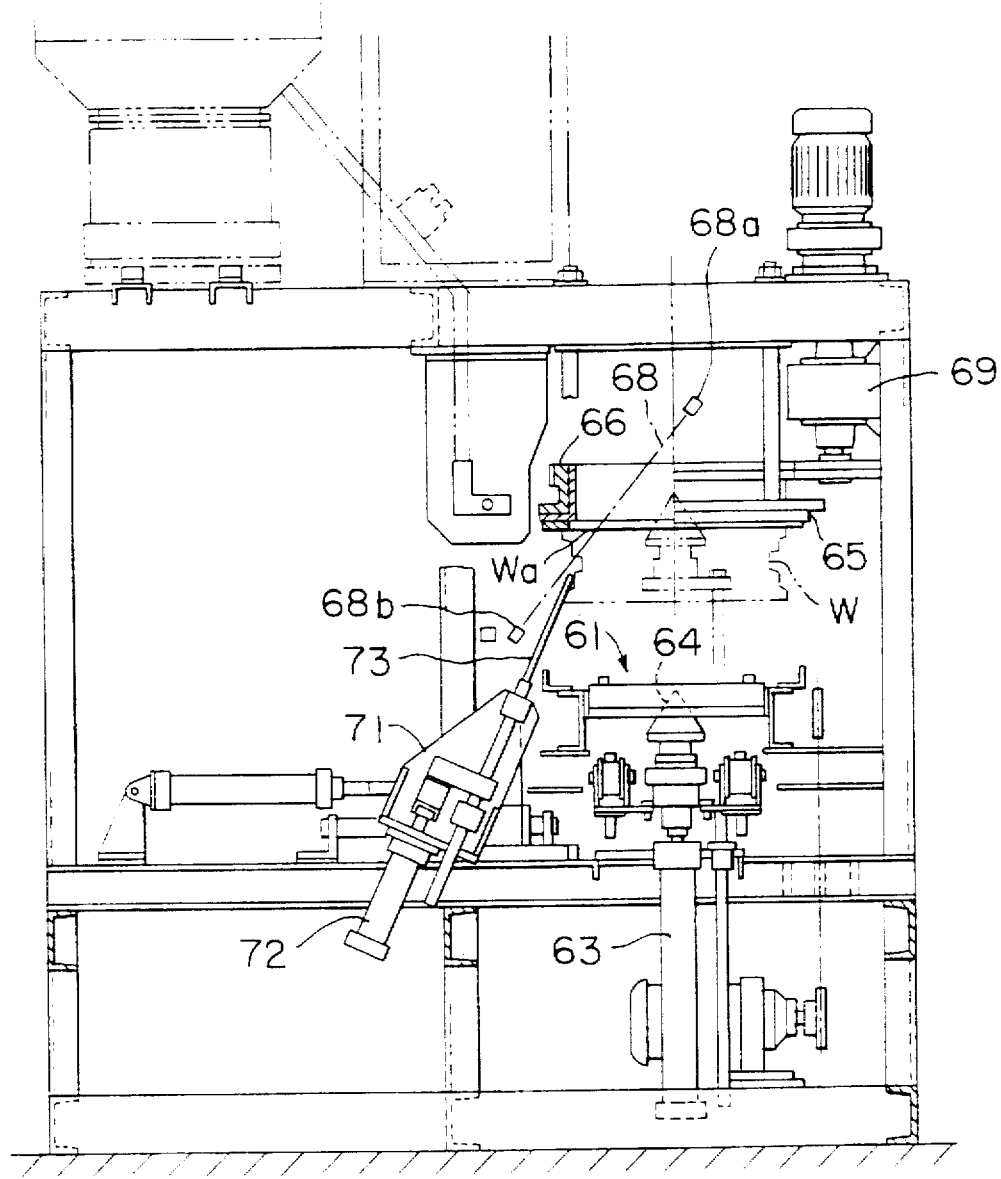
FIG. 12 is a front view, partially in section, for illustrating a conventional automatic tire valve insertion apparatus for tubeless tire.
Figure 13:
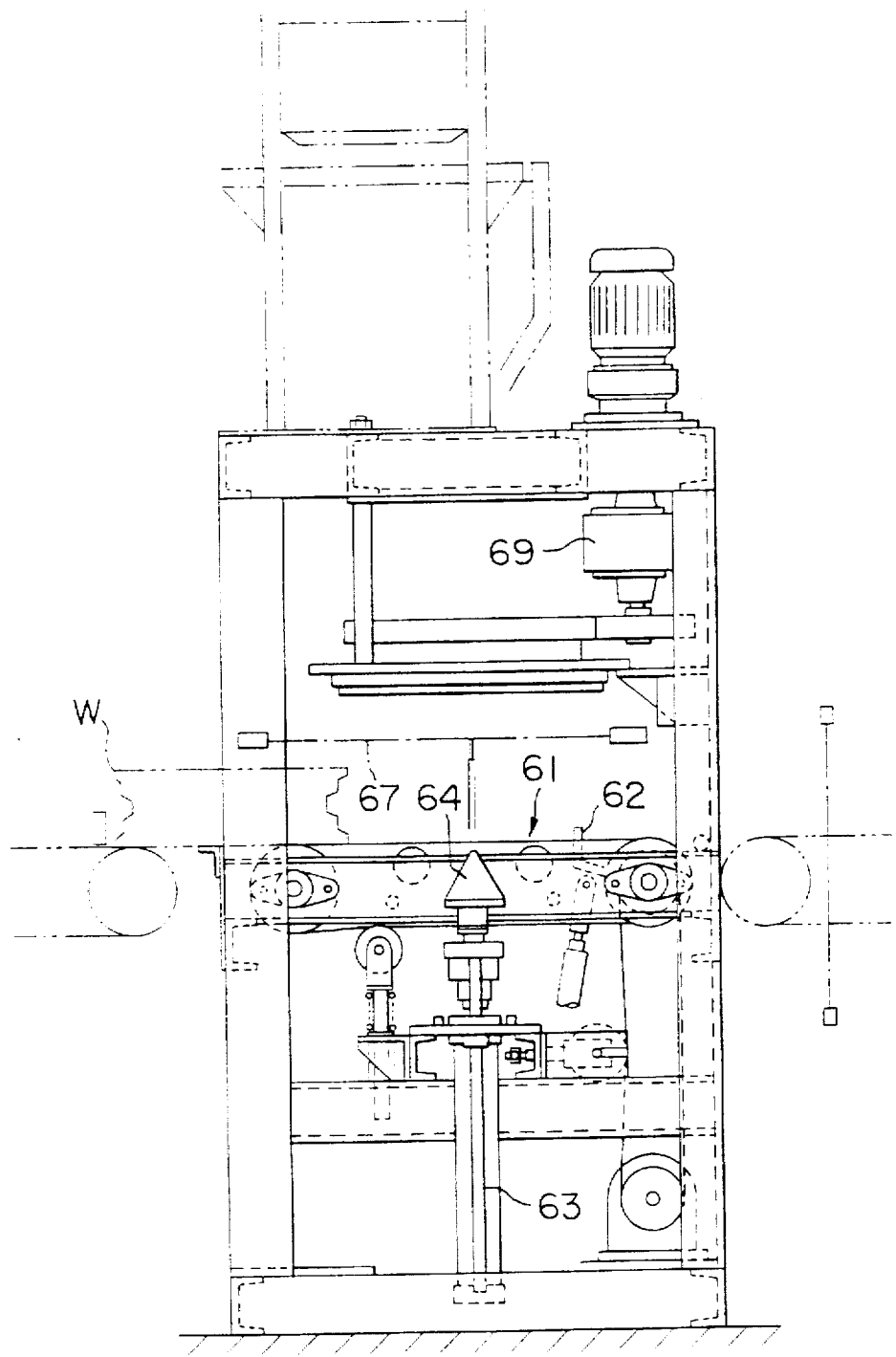
FIG. 13 is a side view of the apparatus shown in FIG. 12.
Figure 14:
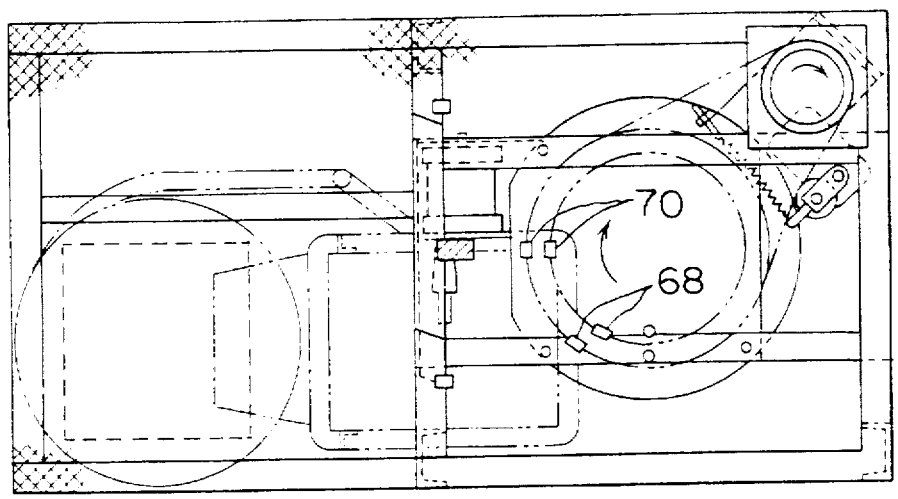
FIG. 14 is a plan view of the apparatus shown in FIG. 12.
Figure 15:
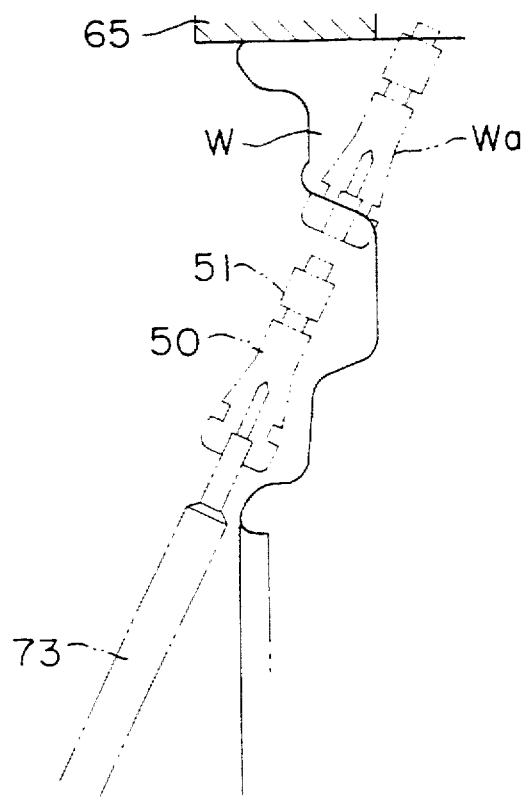
FIG. 15 is a view for illustrating the way a tire valve is inserted.
Figure 16:
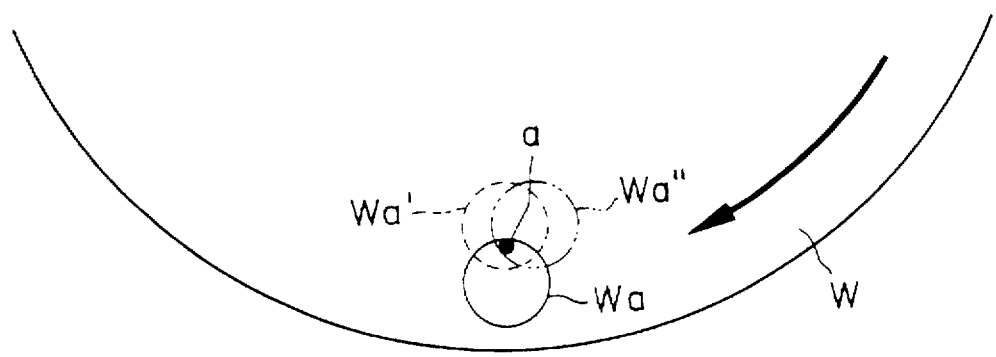
FIG. 16 is a diagram for illustrating a conventional valve hole detecting switch.

According to the embodiment described above, the valve hole detecting switch 39 includes the light emitting element 40 and the light sensing element 41, the sensing element 41 being formed of the wide-range sensor which is elongated in the radial direction of the wheel driving pulley 37, that is, the direction perpendicular to the circular path of movement of the valve hole Wa of the wheel W which rotates in synchronism with the pulley 37. As shown in the plan view of FIG. 10 which corresponds to FIG. 4, however, a plurality of light emitting elements 40 and light sensing elements 41 may be arranged in a line in the direction perpendicular to the circular path of movement of the valve hole Wa of the wheel W. In the arrangement described above, moreover, the rotating wheel W is stopped and reversed after its valve hole Wa is detected by the valve hole detecting switch 39, the valve hole Wa is detected again by the same detecting switch, and the wheel W is stopped at the position for tire valve insertion. Alternatively, however, separate detecting switches may be provided for detecting the valve hole Wa and stopping the wheel at the tire valve insertion position so that the wheel can be rotated in the same direction without being reversed.

According to the automatic tire valve insertion apparatus for tubeless tire, the valve hole of the wheel being rotated is detected, the wheel is stopped at the predetermined position by braking, and the tire valve is inserted into the valve hole of the wheel at the predetermined position by means of the push rod of the valve press-fitting device. The valve hole detecting switch for detecting the valve hole includes the light emitting unit and the light sensing unit arranged facing each other across the rotating wheel. Also, the light sensing unit receives the light with the width range elongated in the direction perpendicular to the circular path of movement of the valve hole. Even though the position of the valve hole varies in the radial direction of the wheel, depending on the wheel width, wheel type, etc., therefore, the wheel can be stopped at an appropriate position by braking, and its position relative to the push rod of the valve press-fitting device can be properly adjusted. Thus, the tire valve can be smoothly inserted into the valve hole of the wheel with high efficiency without entailing damage to the tire valve, wheel, push rod, etc.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An automatic tire valve insertion apparatus for use in inserting a valve in a tubeless tire, comprising:

a wheel rotating device to mount and rotate a wheel and to adjust a position of a hole of the wheel to a predetermined attitude appropriate for inserting a tubeless tire valve into the hole;

a wheel size detecting device provided near the wheel to detect a wheel size thereof and to generate a wheel size signal;

a valve press-fitting device located at the wheel rotating device side to insert the tubeless tire valve into the hole;

a support device to mount the valve press-fitting device and to adjust the predetermined attitude in accordance with the wheel size signal;

a light emitting unit mounted on the wheel rotating device to emit light through the hole in a perpendicular direction against a circular path of the hole when the wheel is rotated on the wheel rotating device; and a light receiving unit mounted on the valve press-fitting device to receive the light in an area with a predetermined width elongated in a radius direction of the wheel and to identify the wheel size, a position of the valve press-fitting device being correctly adjusted to straightforwardly insert the tubeless tire valve into the hole by aligning an axis of the light with an inserting direction of the press-fitting device.

2. The apparatus according to claim 1, wherein said light emitting unit and said light sensing unit have a light emitting range and a light sensing range, respectively, elongated in the direction perpendicular to the circular path of movement.

3. The apparatus according to claim 1, wherein a plurality of said light emitting units and said light sensing units are arranged in a line in the direction perpendicular to the circular path of movement.

4. The apparatus according to claim 1, wherein said valve press-fitting device includes a push rod actuating unit and the push rod having a proximal end supported on the push rod actuating unit by means of a flexible portion.

5. The apparatus according to claim 4, wherein said flexible portion is an elastic member having one end connected to the push rod actuating unit and the other end connected to the proximal end of the push rod.

6. The apparatus according to claim 4, wherein said flexible portion includes a joint rockably connecting the push rod actuating unit and the proximal end of the push rod and an elastic member containing the joint therein and connecting the push rod actuating unit and the proximal end of the push rod.

* * * * *